US011060225B2

(12) United States Patent
Lv et al.

(10) Patent No.: US 11,060,225 B2
(45) Date of Patent: Jul. 13, 2021

(54) CONTROL METHOD OF A WATER-SAVING WASHING MACHINE AND WASHING MACHINE

(71) Applicant: QINGDAO HAIER WASHING MACHINE CO., LTD., Shandong (CN)

(72) Inventors: Peishi Lv, Shandong (CN); Lin Yang, Shandong (CN); Jie Xu, Shandong (CN); Dafeng Fang, Shandong (CN); Lingchen Wang, Shandong (CN)

(73) Assignee: QINGDAO HAIER WASHING MACHINE CO., LTD., Shandong (CN)

( * ) Notice: Subject to any disclaimer, the term of this patent is extended or adjusted under 35 U.S.C. 154(b) by 809 days.

(21) Appl. No.: 15/755,606

(22) PCT Filed: Aug. 9, 2016

(86) PCT No.: PCT/CN2016/094136
§ 371 (c)(1),
(2) Date: Feb. 27, 2018

(87) PCT Pub. No.: WO2017/036276
PCT Pub. Date: Mar. 9, 2017

(65) Prior Publication Data
US 2019/0024283 A1 Jan. 24, 2019

(30) Foreign Application Priority Data
Aug. 31, 2015 (CN) .......................... 201510547634.3

(51) Int. Cl.
*D06F 33/00* (2020.01)
*D06F 37/42* (2006.01)
(Continued)

(52) U.S. Cl.
CPC .............. *D06F 33/00* (2013.01); *D06F 23/04* (2013.01); *D06F 37/267* (2013.01);
(Continued)

(58) Field of Classification Search
None
See application file for complete search history.

(56) References Cited

U.S. PATENT DOCUMENTS

| 2003/0172688 A1 | 9/2003 | Fukui et al. |
| 2018/0016730 A1 | 1/2018 | Lv et al. |

FOREIGN PATENT DOCUMENTS

| CN | 1442533 A | 9/2003 |
| CN | 1572957 A | 2/2005 |

(Continued)

OTHER PUBLICATIONS

CN105986403A translation from www.espacenet.com (Year: 2015).*
(Continued)

*Primary Examiner* — Rita P Adhlakha
(74) *Attorney, Agent, or Firm* — Buchanan Ingersoll & Rooney PC

(57) ABSTRACT

A control method of a water-saving washing machine and washing machine, of which a locking hole and a drainage port are formed in a bottom of an inner tub, and a locking mechanism and a drainage control mechanism are arranged at the bottom of an outer tub, comprising: Step I: carrying out a washing/rinsing procedure, a master control board controlling the locking mechanism to couple with the locking hole to lock the inner tub, and the drainage control mechanism blocking off the drainage port, supplying water to the inner tub, starting washing; Step II: carrying out a drainage procedure, the master control board controlling the drainage control mechanism to open the drainage port, water in the inner tub being drained; Step III: carrying out a dewatering procedure, the master control board controlling the locking mechanism to release the inner tub to drive the inner barrel to rotate for dehydration.

14 Claims, 9 Drawing Sheets

(51) Int. Cl.
*D06F 39/08* (2006.01)
*D06F 23/04* (2006.01)
*D06F 37/26* (2006.01)
*D06F 37/30* (2020.01)

(52) U.S. Cl.
CPC ............ *D06F 37/302* (2013.01); *D06F 37/42* (2013.01); *D06F 39/083* (2013.01); *D06F 39/087* (2013.01)

(56) References Cited

FOREIGN PATENT DOCUMENTS

| | | |
|---|---|---|
| CN | 2755140 Y | 2/2006 |
| CN | 202323456 U | 7/2012 |
| CN | 204298645 U | 4/2015 |
| CN | 104593990 A | 5/2015 |
| CN | 105986403 A | 10/2016 |
| CN | 105986429 A | 10/2016 |
| JP | 2003-103096 A | 4/2003 |

OTHER PUBLICATIONS

International Search Report (PCT/ISA/210) dated Oct. 24, 2016, by the State Intellectual Property Office of the P.R. China, as the International Searching Authority for International Application No. PCT/CN2016/094136.

Written Opinion (PCT/ISA/237) dated Oct. 24, 2016, by the State Intellectual Property Office of the P.R. China, as the International Searching Authority for International Application No. PCT/CN2016/094136.

* cited by examiner

CONTROL METHOD OF A WATER-SAVING WASHING MACHINE AND WASHING MACHINE

TECHNICAL FIELD

The present disclosure relates to the field of washing machines and particularly relates to a control method of a water-saving washing machine and washing machine.

BACKGROUND

For the existing pulsator washing machines, an inner tub communicates with an outer tub through water through holes in the inner tub; the inner tub serves as a washing barrel, the outer tub serves as a water containing barrel. The water filling an area between the side wall of the inner tub and the side wall of the outer tub does not participate in washing, and water which truly participates in washing is only in the inner tub, so that the wasting of water resources is relatively huge. In addition, too much water between the inner tub and the outer tub will lower the concentration of an abstergent/detergent powder in a washing solution. Meanwhile, due to frequent entrance/exit of water flow between the inner tub and the outer tub, after sustained use, the area between the side wall of the inner tub and the side wall of the outer tub becomes a dirt hiding space, and water scales in tap water, free substances of detergent powder, cellulose of clothing, organic matters of human bodies and dust and bacteria brought by clothing extremely easily stay between the side wall of the inner tub and the side wall of the outer tub. Mold is multiplied and propagated from a great quantity of dirt accumulated inside a washing machine used for a long time due to the fact that the dirt cannot be effectively removed, bacteria will be attached to the clothing and brought to the human bodies in next washing if the dirt, which is unseen to users, is not removed, and thus, the problem of cross infection is caused.

A Chinese patent with the application number of CN200420107890.8 relates to a full automatic washing machine which mainly comprises a box body, a washing/dewatering barrel, a water containing barrel and a driving device. The water containing barrel is mounted outside the washing/dewatering barrel and is fixedly connected with the box body, a sealing device is arranged between a bottom face of an internal wall of the water containing barrel and a bottom face of an external wall of the washing/dewatering barrel, and a sealing chamber is formed in the sealing device; an external side wall of the washing/dewatering barrel is free of through holes, and a drainage port communicating with the sealing chamber is formed in the bottom of the washing/dewatering barrel; and a drainage port communicating with a drainage pipe is formed in the water containing barrel, and a drainage valve is arranged on the drainage pipe. The water containing barrel is fixedly connected with the box body by a suspender, one end of the suspender is connected with an internal wall of the upper end of the box body, and the other end of the suspender is connected with an external wall of the water containing barrel. In long-time running, due to long-time running wear of the sealing structure, worn water leakage is easily caused, if water quality is relatively poor and the silt content is relatively high, the service life of the washing machine will be greatly shortened, and thus, due functions cannot be achieved. The washing machine cannot be used under the condition of large washing capacity, and the reliability is relatively poor.

Taking this into consideration, the present disclosure is provided.

SUMMARY

An object of the present invention is to overcome defects in the prior art and provide a control method of a water-saving washing machine and washing machine.

In order to achieve the object, the present invention adopts a technical scheme as follows:

A control method of a water-saving washing machine, of which a locking hole and a drainage port are formed in the bottom of an inner tub, and a locking mechanism and a drainage control mechanism are arranged at the bottom of an outer tub, comprising:

Step I: carrying out a washing/rinsing procedure, a master control board controlling the locking mechanism to couple with the locking hole to lock the inner tub, and the drainage control mechanism blocking off the drainage port, supplying water to the inner tub of the washing machine until a set water level or water volume is reached, starting washing, wherein water is absent between the inner tub and the outer tub;

Step II: carrying out a drainage procedure after the washing/rinsing procedure ends up, the master control board controlling the drainage control mechanism to open the drainage port, and water in the inner tub being drained through the drainage port;

Step III: carrying out a dewatering procedure after the drainage procedure ends up, the master control board controlling the locking mechanism to release the inner tub, and to drive the inner tub to rotate for dehydration.

In the Step I, the master control board sends out an inner tub locking command after receiving a washing/rinsing signal, the inner tub is driven to rotate to enable the locking hole to be in a position corresponding to a the locking rod of the locking mechanism, and the locking rod is controlled to get into the locking hole, the locking mechanism sends out a locked-in-place signal to the master control board after the locking rod sticks into the locking hole in place.

After the master control board sends out the inner tub locking command and receives the locked-in-place signal, the master control board sends out a drainage port closing command, a valve plug of the drainage control mechanism is controlled to protrude to block off the drainage port;

if the master control board does not receive the locked-in-place signal sent from the locking mechanism in set time or set detection times after sending out the inner tub locking command, the master control board controls the locking rod to be subjected to restoring and resends out the inner tub locking command;

if the master control board does not receive the locked-in-place signal sent from the locking mechanism in the set time or set detection times after resending out the inner tub locking command for set times, the master control board sends out a warning command and performs warning.

In the step II, after the washing/rinsing procedure ends up, the master control board sends out a drainage valve opening command and controls the valve plug of the drainage control mechanism to be subjected to restoring, and the drainage port is opened to drain.

In the step III, after the drainage procedure ends up, the master control board sends out an inner tub releasing command and controls the locking rod to restore, the locking mechanism sends out an unlocked-in-place signal after the locking rod is subjected to restoring, and the inner tub is controlled to rotate to carry out dehydrating after the master control board receives the unlocked-in-place signal.

The locking rod is a diameter-variable cylinder, a position switch is arranged at the locking mechanism corresponding to an outer side of the locking rod;

after the locking rod sticks into the locking hole in place and the locking rod is subjected to restoring, portions with different diameters, of the locking rod correspond to a contact of the position switch and trigger the position switch to send out corresponding signals.

After the locking rod sticks into the locking hole in place, the portion with a small diameter of the locking rod corresponds to the position switch, the contact is released, and the position switch sends out the locked-in-place signal to the master control board;

after the locking rod is subjected to restoring, the portion with a big diameter of the locking rod corresponds to the contact of the position switch, the contact is compressed, and the position switch sends out the unlocked-in-place signal to the master control board;

Or, after the locking rod sticks into the locking hole in place, the portions with a big diameter of the locking rod corresponds to the position switch, the contact is compressed, and the position switch sends out the locked-in-place signal to the master control board;

after the locking rod is subjected to restoring, the portion with a small diameter, of the locking rod corresponds to the contact of the position switch, the contact is reset, and the position switch sends out the unlocked-in-place signal to the master control board.

In the step II and the step III, the locking mechanism is controlled to leave the locking hole to release the inner tub while or before the master control board controls the drainage control mechanism to open the drainage port.

A washing machine having the above control method.

By adopting the technical scheme, the present disclosure has the following beneficial effects:

1. The locking mechanism is provided with the position switch; after the locking rod stretches into the locking hole and is locked in place, the triggering structure triggers the position switch, and the position switch sends out a locked-in-place signal; and after the locking rod retracts from the locking hole and is subjected to restoring, the triggering structure triggers the position switch, an unlocked-in-place signal is sent out, and thus, a master control board of the washing machine can control the washing machine to perform a procedure of the next step. Whether the locking rod is locked in place or unlocked in place or not is accurately judged by using the position of the locking rod, the judgment is accurate, and the structure is simple.

2. The locking mechanism is provided with an idle stroke; when the locking mechanism receives a false signal, the locking rod stretches out, but does not stretch into the locking hole, the locking rod tightly jacks up the bottom of the inner tub, and the rotating motor drives the crank or link to move in the idle stroke; and when the motor-driven highest point is passed, the motor continues to drive the locking rod to downwards move to reset, the locking rod re-enters the next working cycle, the damage to the motor or the bottom of the inner tub cannot be caused, manual regulating or washing machine disassembled maintenance is not required, the failure of the washing machine is avoided, and unnecessary trouble to users is avoided.

3. A drainage control mechanism is provided with an idle stroke; when the drainage control mechanism receives a false signal, a valve plug stretches out, but does not stretch into a drainage port, the valve plug jacks up the bottom of the inner tub, and the rotating motor drives the crank or link to move in the idle stroke; and when the motor-driven highest point is passed, the motor continues to drive the valve plug to downwards move to reset, the valve plug re-enters the next working cycle, the damage to the motor or the bottom of the inner tub cannot be caused, manual setting or washing machine disassembled maintenance is not required, the failure of the washing machine is avoided, and unnecessary trouble to users is avoided.

4. According to the control method, the washing on the condition that water is absent between the inner tub and the outer tub is achieved through controlling a sequence of operation of the locking mechanism for the inner tub and the drainage control mechanism of the drainage port of the inner tub, and normal dewatering can also be achieved; and the control method is accurate in control, and water-saving washing of the washing machine is smoothly guaranteed.

The specific embodiments of the present disclosure are further described in detail below with reference to the drawings.

In the figures, numeric symbols are as follows: 100—inner tub, 101—inner tub body, 102—inner tub bottom, 103—inner tub flange, 104—balancing ring, 105—drainage port, 106—drainage hole, 200—outer tub, 201—first mounting hole, 202—outer tub bottom, 204—second mounting hole, 300—locking mechanism, 301—locking hole, 302—locking rod, 303—fixing seat, 304—slideway, 305—fixing shell, 306—sealing ring, 307—sealing sleeve, 308—first end, 309—second end, 310—third end, 320—boss, 321—second spring, 323—eccentric wheel, 324—rotating motor, 328—shell, 329—mounting part, 330—connecting arm, 331—elliptical hole, 332—first spring, 334—slider, 335—mounting column, 336—position switch, 337—first locking part, 338—second locking part, 339—groove, 400—drainage control mechanism, 401—valve rod, 402—sealing sleeve, 403—blocking sheet, 404—first end, 405—second end, 407—fixing seat, 408—slideway, 409—fixing shell, 410—turn-up, 411—water leaking port, 413—second spring, 415—eccentric wheel, 416—rotating motor, 417— shell, 418—mounting part, 421—connecting arm, 422—elliptical hole, 423—first spring, 424—slider, 425—mounting column, and 426—groove.

DETAILED DESCRIPTION

Figure 1:
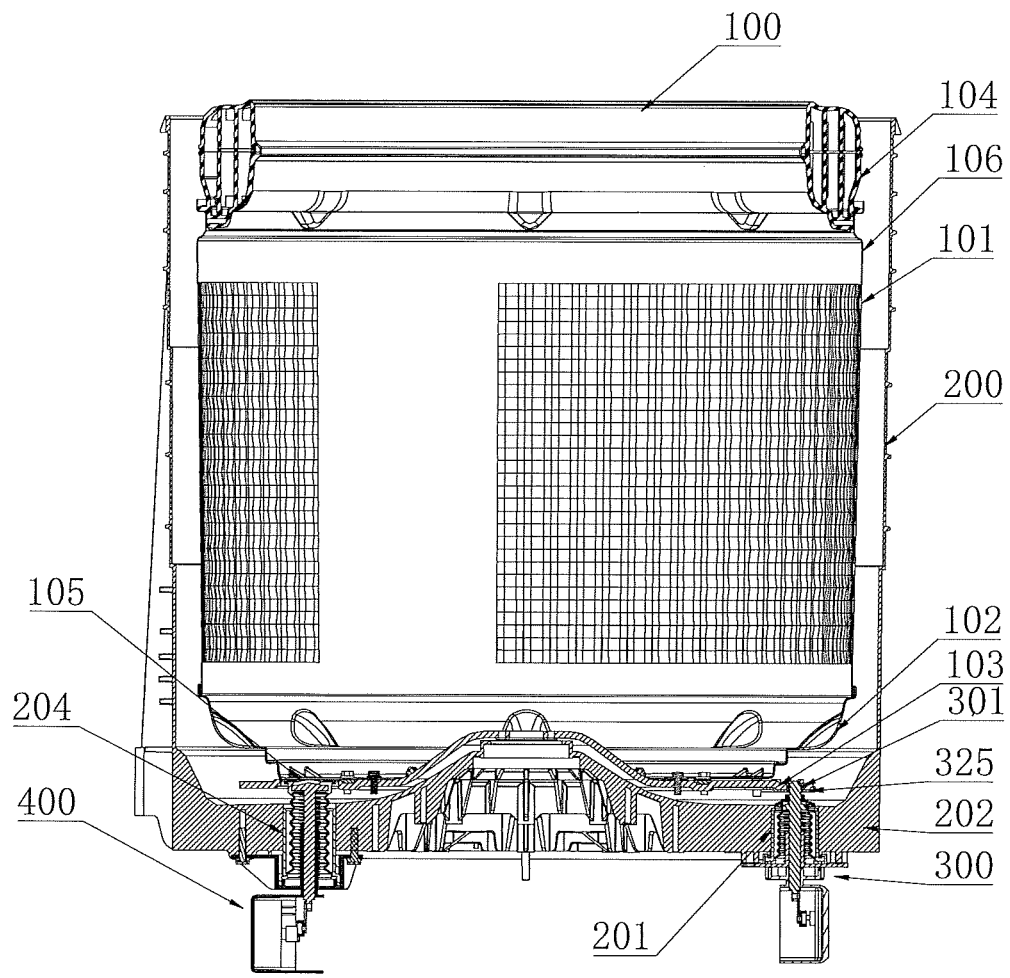
FIG. 1 is a structural drawing of a washing machine of the present disclosure.
Figure 2:
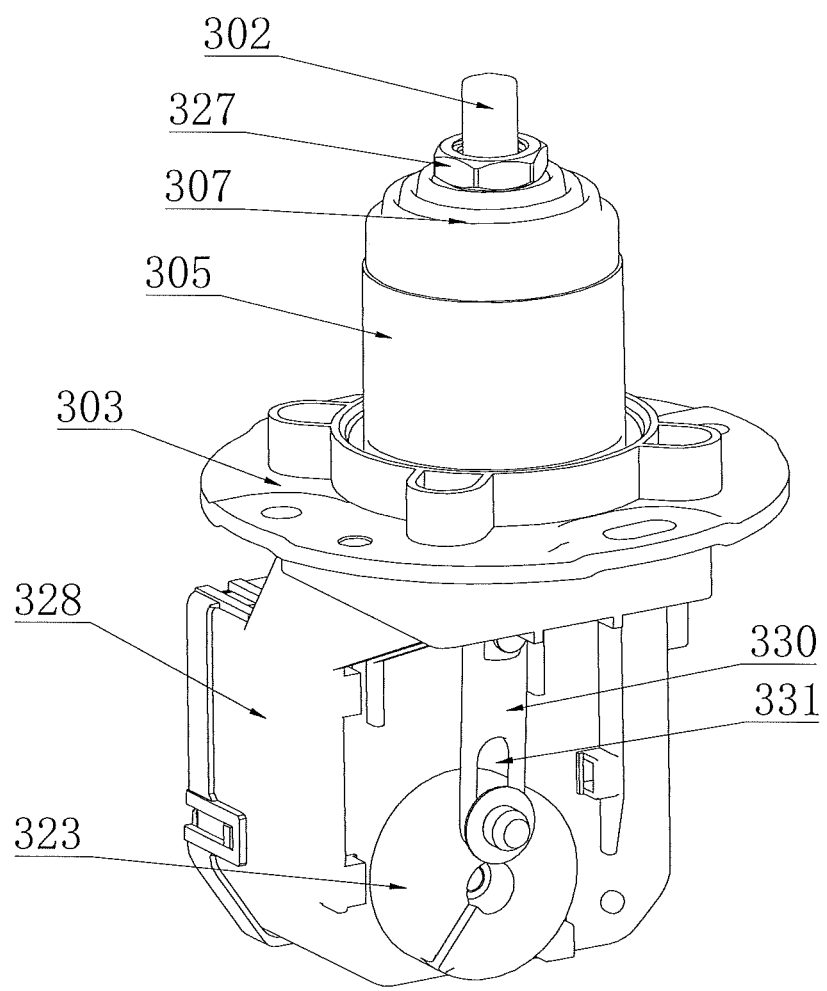
FIG. 2 is a stereogram of a locking mechanism of the present disclosure.
Figure 3:
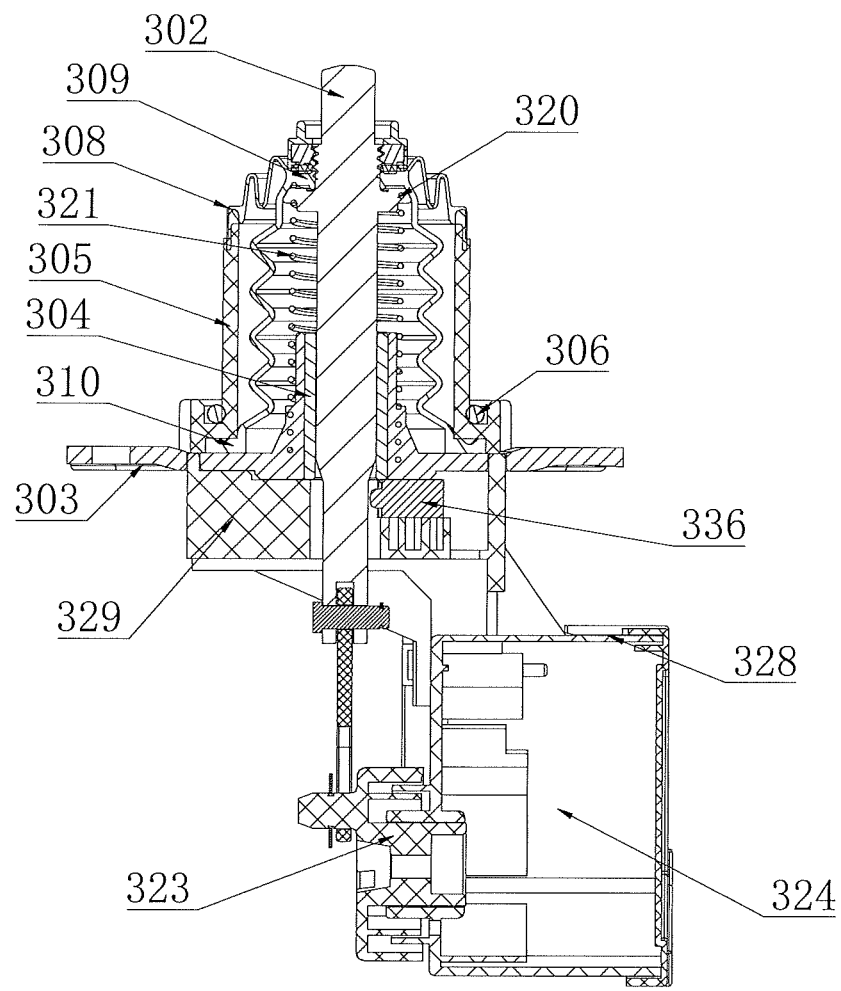
FIG. 3 is a sectional view of the locking mechanism of the present disclosure.
Figure 4:
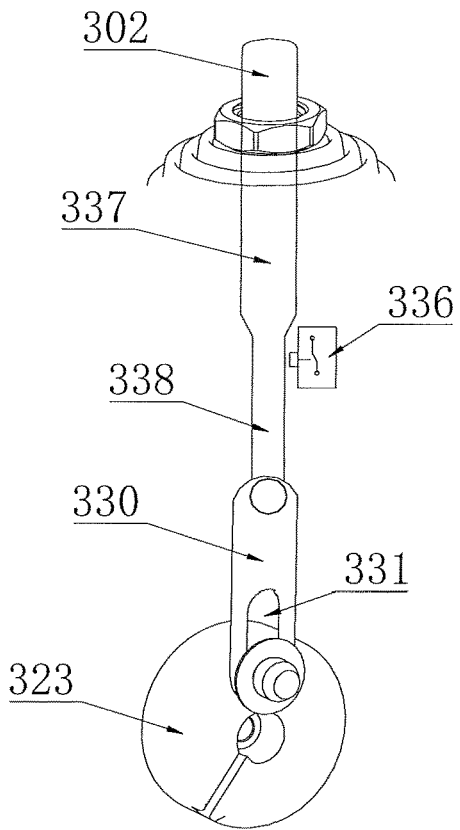
FIG. 4 is a structural schematic diagram of a locking rod and a position switch of the present disclosure.
Figure 5:
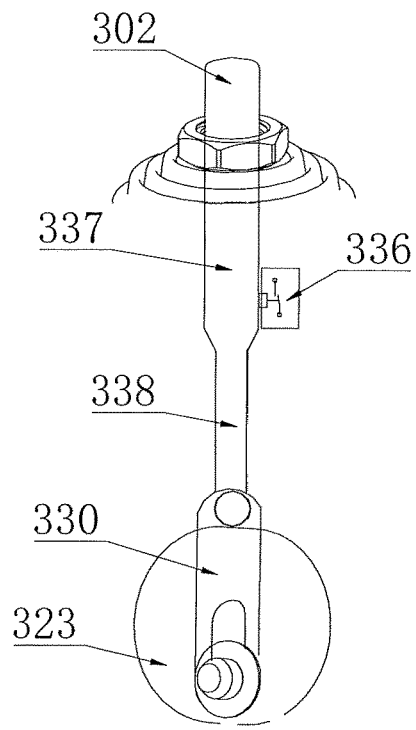
FIG. 5 is a structural schematic diagram of the locking rod and the position switch of the present disclosure.
Figure 6:
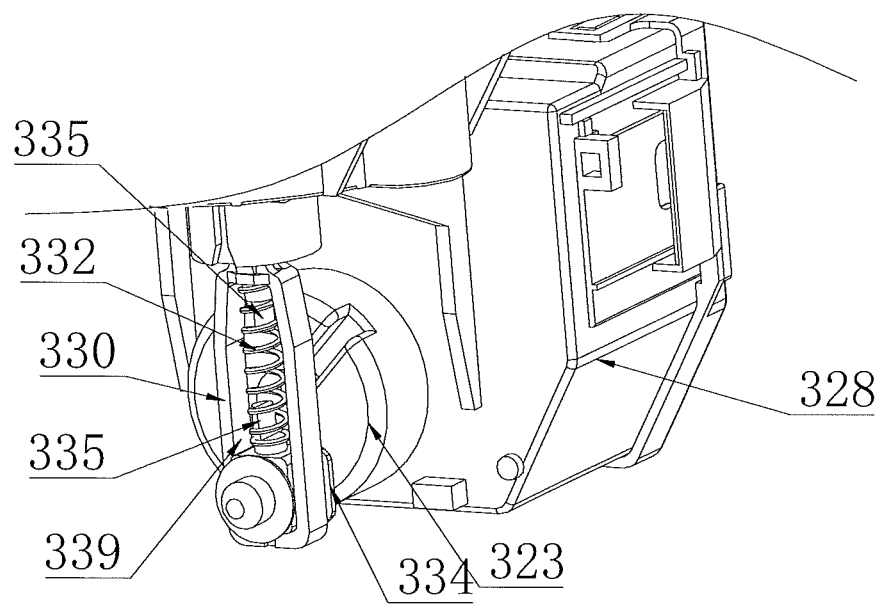
FIG. 6 is a structural drawing of a link of the locking mechanism of the present disclosure.
Figure 7:
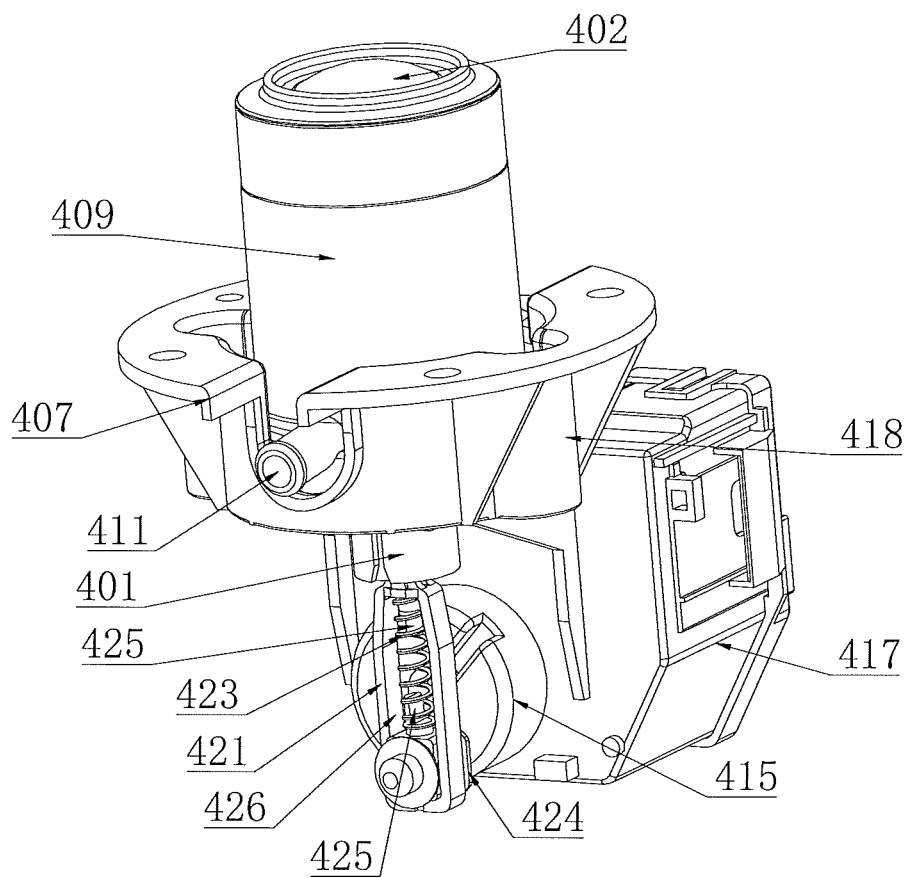
FIG. 7 is a stereogram of a drainage control mechanism of the present disclosure.
Figure 8:
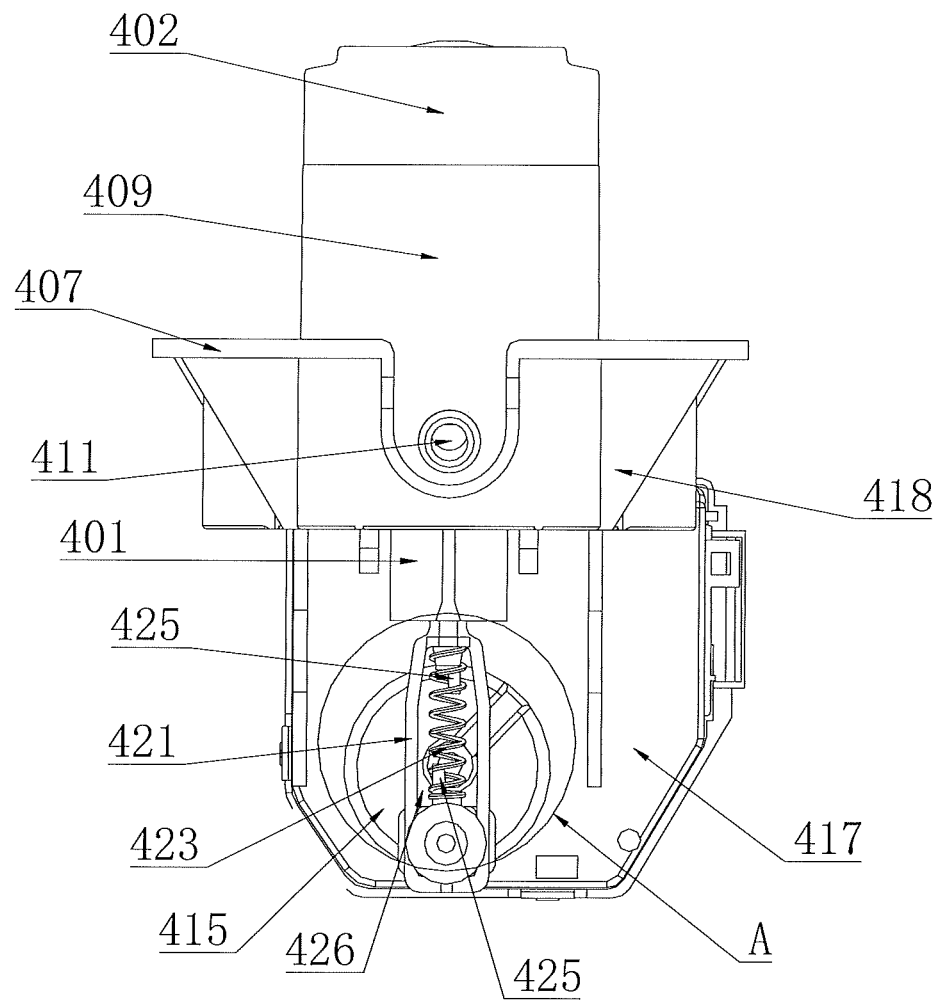
FIG. 8 is a front view of the drainage control mechanism of the present disclosure.
Figure 9:
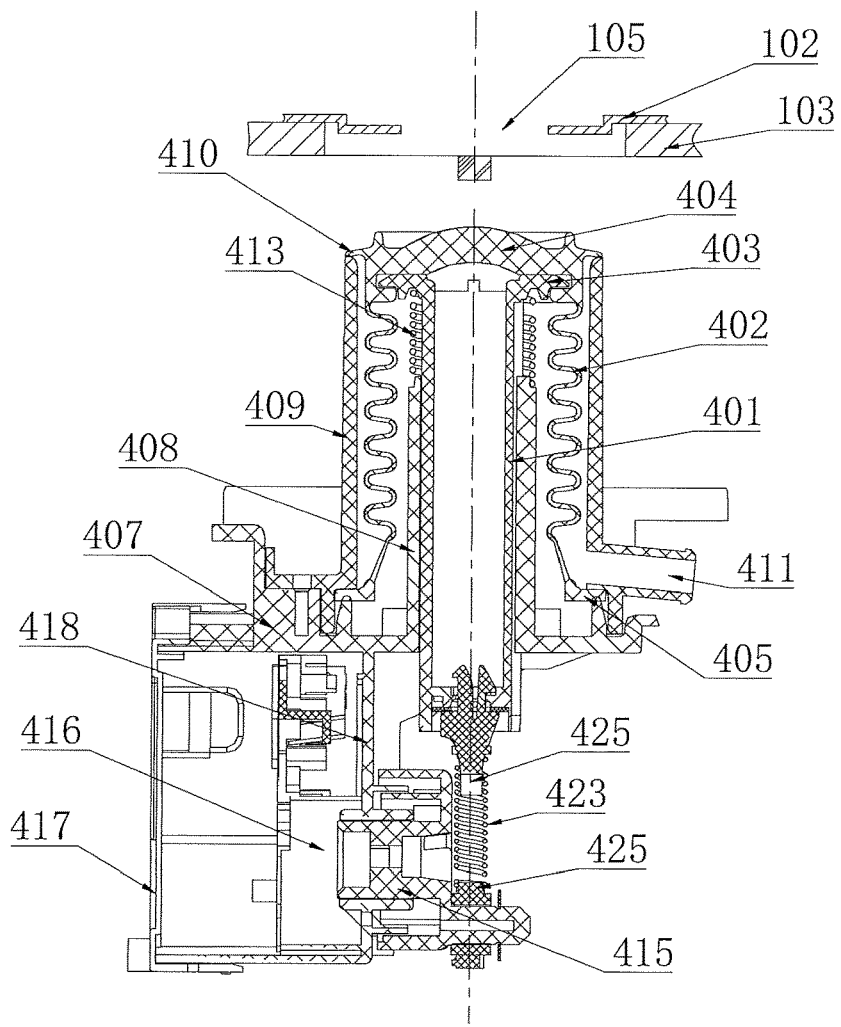
FIG. 9 is a sectional view of the drainage control mechanism of the present disclosure.
Figure 10:
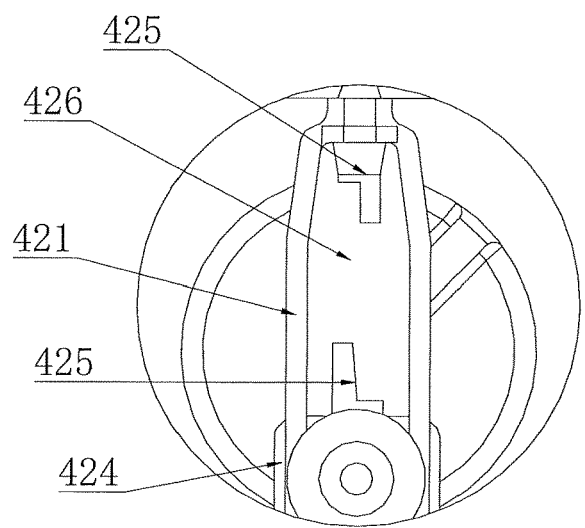
FIG. 10 is an enlarged view of a portion A in FIG. 8
Figure 11:
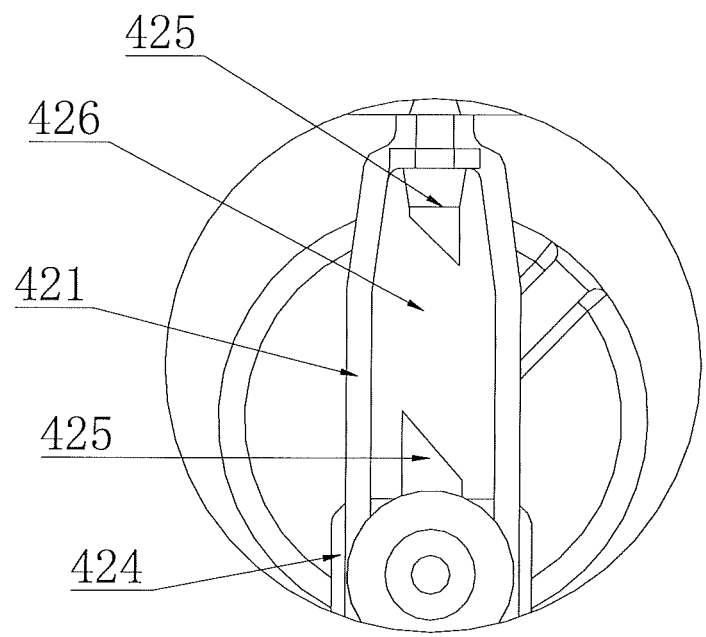
FIG. 11 is an enlarged view of a portion A in FIG. 8
Figure 12:
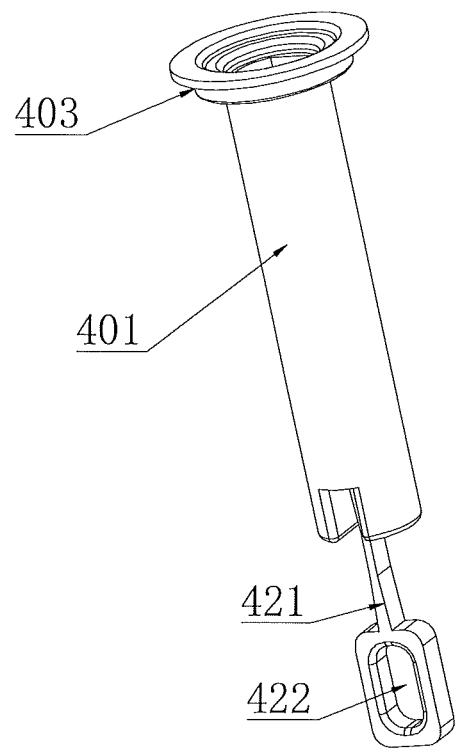
FIG. 12 is a partial structural drawing of the drainage control mechanism of the present disclosure.

Referring to FIG. 1, a washing machine provided by the present disclosure comprises an inner tub 100 and an outer tub 200, an inner tub body 101 is free of a water leakage hole communicating with the outer tub, a drainage port 105 is formed in an inner tub bottom 102, a circle of drainage holes 106 are formed in the upper part of the inner tub body 101. During washing, the drainage port 105 is closed, a water level is lower than height of the drainage holes 106, water is only present in the inner tub 100, and the water is absent between the inner tub 100 and the outer tub 200; after the washing ends, the drainage port 105 is opened, and the majority of the water is drained from the drainage port 105. During dewatering, the inner tub 100 rotates, and water which removed from clothing rises along a tub wall due to the action of a centrifugal force is discharged from the inner tub through the drainage holes 106 in the upper part of the inner tub, then enters a space between the inner tub and the outer tub and then is discharged via an outer tub drainage port of the outer tub 200. Thus, during washing, washing water is only stored in the inner tub 100 and is absent between the inner tub and the outer tub, then, the water is saved, meanwhile, dirt is not accumulated in an area between the side wall of the inner tub and the side wall of the outer tub, thus, the space between the inner tub and the outer tub is clean, and the multiplication of bacteria is avoided. During drainage and/or dewatering, the drainage port 105 is opened, the majority of the water and sediments such as silt and particles are discharged into the outer tub from the lower drainage port 105, the water in the clothing is discharged into the outer tub from the drainage holes 106 in the upper part of the inner tub during the high-speed rotating-dewatering of the inner tub and is directly discharged out of the washing machine via the drainage port in the bottom of the outer tub and a drainage pipe, thus, rapid drainage is achieved, and water drainage and pollution discharge effects are good.

A drainage control mechanism 400 which is used for controlling the drainage port 105 to be opened/closed is arranged at the bottom of the drainage port 105; during water inflow and washing, the drainage control mechanism 400 blocks up the drainage port 105 and controls the drainage port 105 to be closed; and during drainage and dewatering, the drainage control mechanism 400 controls the drainage port 105 to be opened.

The drainage control mechanism 400 is arranged under the outer tub 200 and is fixed on the circumference, and the drainage port 105 is formed in the inner tub 100. During dewatering, the inner tub rotates; when the drainage port 105 is required to be closed by the drainage control mechanism 400, the position of the drainage port 105 and the position of the drainage control mechanism 400 are not always the same. In the present disclosure a locking mechanism 300 is additionally arranged below the inner tub 100 and is used for firstly locating the inner tub until the drainage port 105 and the drainage control mechanism 400 are of positional correspondence, then, the inner drum 100 is locked and the drainage port 105 is blocked up by the drainage control mechanism 400. The locking mechanism 300 can also be used for effectively preventing the inner tub 100 from rotating during the water inflow and washing of the washing machine, causing the drainage control mechanism 400, which is used for controlling the drainage port 105 to be opened/closed, at the bottom of the inner tub to be out of operation.

A locking hole 301 is formed in the bottom of the inner tub, which is a blind hole and does not communicate with the interior of the inner tub. The locking mechanism 300 of the inner tub is mounted at the bottom of the outer tub and at least comprises a stretchable and retractable locking rod 302 which is fixed in the circumferential direction. During washing and rinsing, the locking rod 302 moves upwards and sticks into the locking hole 301, the inner tub 100 is locked and cannot rotate; then, the drainage port 105 is blocked up by the drainage control mechanism 400, water is absent between the inner tub and the outer tub, and the drainage control mechanism 400 can be prevented from being disabled due to the fact that the inner tub 100 is locked. During dewatering, the locking rod 302 moves downwards and out of the locking hole 301, and the inner tub rotates in the circumferential direction and dewaters the clothing inside the inner tub.

When the drainage port 105 of the bottom of the inner tub 100 is required to be blocked up, the locking rod 302 moves upwards and sticks into the locking hole 301, the inner tub 100 is locked, and the drainage port 105 is blocked up by the drainage control mechanism 400. And when the inner tub 100 is required to rotate, the locking rod 302 moves downwards and leaves the locking hole 301, the inner tub rotates in the circumferential direction, the locking rod 302 moves downwards until the locking rod 302 is level with the internal bottom face of the outer tub 200, and the rotation of the inner tub 100 is not affected.

Embodiment I

Referring to FIG. 2 to FIG. 6, a locking mechanism provided by the present disclosure at least comprises a locking rod 302, a slideway and a driving unit, wherein the locking rod 302 can reciprocate along the axial direction, the slideway is for the movement of the locking rod, and the driving unit is used for driving the locking rod to move; and an inner tub 100 is locked when the locking rod 302 sticks into a locking hole 301, and the inner tub 100 is unlocked when the locking rod 302 leaves the locking hole 301.

The locking mechanism further comprises a fixing seat 303 of the locking rod 302, the slideway 304 is arranged at the center of the fixing seat 303, the locking rod 302 penetrates through the slideway 304. Preferably, the fixing seat 303 is of an annular structure, and the center of the fixing seat 303 is upwards or downwards bent to form the slideway 304.

The locking mechanism further comprises a fixing shell 305, the fixing shell 305 is mounted at the upper part of the fixing seat 303 and is fixedly connected with the fixing seat 303, the fixing shell 305 and the fixing seat 303 are threaded connection. The locking rod 302 and the slideway 304 are arranged in the fixing shell 305, and a sealing structure is arranged between the fixing shell 305 and the locking rod 302. The sealing structure is a stretchable and retractable structure, preferably a corrugated sealing sleeve 307. One end of the sealing sleeve is in sealed connection with the locking rod, and the other end of the sealing sleeve is in sealed connection with the fixing shell.

A boss 320 is arranged at the upper part of the locking rod, a second spring 321 is arranged below the lower part of the boss 320, one end of the second spring 321 is in contact with the lower surface of the boss, the other end of the second spring 321 is fixed, and the second spring 321 is compressed when the locking rod 302 moves downwards. Preferably, the other end of the second spring 321 is in fixed contact with the fixing seat 303, and a resetting force of the second spring 321 drives the locking rod 302 to move upwards.

The locking mechanism further comprises a crank-link structure, the lower end of the locking rod is connected with a link of the crank-link structure, a crank is connected with a rotating motor 324. Preferably, the rotating motor 324 is arranged in a shell 328, the shell is provided with a mounting part 329, the mounting part 329 is mounted below the lower end of the fixing seat; and a through hole, which is used for enabling the locking rod 302 to pass through, is formed in the center of the mounting part.

Downward resetting movement of the locking rod 302 is driven by the crank-link structure, and upward stretching of the locking rod 302 is driven by the resetting force of the second spring 321 after the crank-link structure releases a tensile force.

Preferably, the crank is an eccentric wheel 323, an eccentric shaft of the eccentric wheel is hinged to the link, and the center of the eccentric wheel is connected with a motor shaft of the rotating motor. When the rotating motor rotates for 360 degrees, the locking rod works by a cycle, can outwards stretch into the locking hole from a retracted state, is locked and then reset through retracting.

The locking mechanism is arranged at the bottom of the outer tub of the washing machine, the sealing structure is arranged between the locking mechanism and the outer tub. Preferably, a first mounting hole 201 for the locking mechanism is formed in the outer tub; the fixing seat of the locking mechanism is mounted at the bottom of the outer tub, the fixing seat 303 is fixedly connected to the outer side of the bottom of the outer tub 200 through threads of bolts, screws or the like; the fixing shell of the locking mechanism is mounted in the mounting hole; the sealing structure is arranged between the fixing shell and the mounting hole. Thus, a place between the fixing shell and the mounting hole is sealed, and the sealing structure is an elastic sealing ring.

Preferably, the upper end of the first mounting hole 201 is inwards bent to form a bend, the lower end of the fixing shell is outwards bent to form a bend, the fixing shell 305 sticks into the first mounting hole 201. The upper end of the fixing shell 305 is abutted against the bend of the upper end of the first mounting hole 201, the end part of the sealing sleeve arranged between the fixing shell and the locking rod is squeezed between the upper end of the fixing shell 305 and the bend of the upper end of the first mounting hole 201 to form a seal. The lower end of the first mounting hole 201 is abutted against the bend of the lower end of the fixing shell, and the sealing structure such as the elastic sealing ring is arranged between the lower end of the first mounting hole 201 and the bend of the lower end of the fixing shell.

The sealing structure between the fixing shell 305 and the locking rod 302 is a sealing sleeve 307 which can stretch and retract along with the stretching and retracting of the locking rod. A first end 308 of the sealing sleeve 307 is in sealed connection with the fixing shell 305, preferably, the first end of the sealing sleeve 307 is arranged between the upper end of the fixing shell 305 and the bend of the upper end of the first mounting hole 201, the sealing sleeve has elasticity and forms a seal. A second end 309 of the sealing sleeve 307 is in sealed connection with the locking rod 302, preferably, the second end 309 of the sealing sleeve 307 is squeezed to the boss of the locking rod 302 through a nut to form a seal, and thus, water in the outer tub cannot enter the fixing shell, cannot damage the locking mechanism 300 and cannot cause water leakage. Preferably, the sealing structure is a corrugated-tube-shaped sealing sleeve 307, has certain retractility, is water-impermeable and can achieve sealing. The sealing sleeve is a sealing sleeve made from an elastic material, such as a rubber sleeve.

A third end 310 extends from the second end 309 of the sealing sleeve 307 along the axial direction and is in sealed connection with the lower end of the fixing shell 305, and the extending part is a sealing sleeve capable of stretching and retracting along with the stretching and retracting of the locking rod, preferably a corrugated-tube-shaped sealing sleeve. The extending sealing sleeve exerts a secondary sealing action, even if the seal presents a problem, the extending sealing sleeve can further play a role in sealing, thus, the safety is improved, and water leakage is avoided. Preferably, the lower end of the fixing shell 305 and the fixing seat squeeze the third end 310 to form a seal.

When the locking rod 302 is retracted to the lowest position, the top end of the locking rod 302 is lower than or level with the internal surface of the bottom of the outer tub, preferably, when the locking rod is retracted to the lowest position, the top end of the locking rod is level with the internal surface of the bottom of the outer tub. The condition that the locking rod 302 or inner tub 100 is damaged due to the fact that the locking rod 302 and the inner tub 100 are in interference when the inner tub 100 rotates can be avoided.

The locking hole 301 is formed in an inner tub flange 103; a smooth groove is formed in each of the two sides, along the circumferential direction of the locking hole 301, of the inner tub flange 103 to form a guide rail, or the guide rail is of a separate structure and a smooth groove is formed in the guide rail, and the locking hole 301 is located at the middle part of the groove. When a rotating speed of the inner tub 100 is lower than a certain set rotating speed, the locking rod 302 is controlled to move upwards and jack up the guide rail; due to the action of the spring 321, the locking rod 302 further has a trend to upwards move, and the inner tub rotates and is in friction with the guide rail and the locking rod 302; and when the locking hole 301 moves to a position of the locking rod 302 and corresponds to the locking rod 302, the locking rod moves upwards and sticks into the locking hole 301, and thus, the located locking of the inner tub 100 is achieved.

The locking mechanism further comprises a position switch 336, and a triggering structure of the position switch is arranged on the locking rod 302; after the locking rod 302 sticks into the locking hole 301 and is locked in place, the triggering structure triggers the position switch, and the position switch 336 sends out a locked-in-place signal; and after the locking rod retracts from the locking hole and is subjected to retracting resetting, the triggering structure triggers the position switch, an unlocked-in-place signal is sent out, and thus, a master control board of the washing machine can control the washing machine to perform a procedure of the next step.

The position switch 336 is fixedly arranged on the slideway at the outer side of the locking rod 302 in a fixed arrangement manner; the triggering structure is arranged on the locking rod 302 and moves together with the locking rod 302. The locking rod 302 sticks into and/or leaves the locking hole 301, the triggering structure on the locking rod triggers the position switch to send out locking rod stretching and/or leaving signals, whether the locking rod is locked in place or unlocked in place or not is accurately judged by using the position of the locking rod, the judgment is accurate, and the structure is simple.

The position switch 336 is a contact switch, a contact point of the contact switch faces to the locking rod 302, and a side face, facing to the contact, of the locking rod at least comprises two side face sections, of which vertical distances to the contact are different. After the locking rod sticks into the locking hole and is locked in place, one side face section is in contact with the contact point, and the contact switch is triggered to send out a locked-in-place signal; and after the locking rod retracts to leave the locking hole and is subjected to retracting resetting, the other side face section is in contact with the contact point, and the contact switch is triggered to send out an unlocked-in-place signal, so that the master control board of the washing machine can control the washing machine to perform a procedure of the next step. A joint of the two side face sections is an oblique transition face. During the retracting of the locking rod, the contact is in contact with the oblique transition face; and by arranging the oblique transition face, the contact switching between the two side face sections and the contact can be successfully carried out, and the jamming of the locking rod is avoided.

The locking rod 302 is of a column body which may be a triangular prism or poly prism and at least comprises a first locking part 337 and a second locking part 338. The first locking part 337 and the second locking part 338 are different in diameter, and the diameter of the first locking part 337 is greater than that of the second locking part 338. After the locking rod 302 sticks into the locking hole 301 and is locked in place, the first locking part 337 is in contact with the contact point, and the contact switch is triggered to send out a locked-in-place signal; and after the locking rod 302 retracts to leave the locking hole 301 and is subjected to retracting resetting, the second locking part 338 is in contact with the contact point, and the contact switch is triggered to send out an unlocked-in-place signal, so that the master control board of the washing machine can control the washing machine to perform a procedure of the next step. Or, after the locking rod 302 sticks into the locking hole and is locked in place, the second locking part 338 is in contact with the contact point, and the contact switch is triggered to send out a locked-in-place signal; and after the locking rod 302 retracts to leave the locking hole and is subjected to retracting resetting, the first locking part 337 is in contact with the contact point, and the contact switch is triggered to send out an unlocked-in-place signal, so that the master control board of the washing machine can control the washing machine to perform a procedure of the next step. A joint of the first locking part and the second locking part is of smooth transition. During the retracting of the locking rod, the contact point is in contact with the oblique transition face; and by arranging the oblique transition face, the contact switching between the locking parts of different diameters and the contact can be successfully carried out, and the sticking of the locking rod is avoided.

Preferably, the locking rod 302 is of a cylinder body, which is conveniently matched with the locking hole and more easily sticks into the locking hole to lock the inner tub. The upper part of the locking rod serves as the first locking part 337, and the lower part of the locking rod serves as the second locking part 338; after the locking rod sticks into the locking hole and is locked in place, the second locking part is in contact with the contact point, and the contact switch is triggered to send out a locked-in-place signal; after the locking rod retracts to leave the locking hole and is subjected to retracting resetting, the first locking part is in contact with the contact point, and the contact switch is triggered to send out an unlocked-in-place signal. The diameter of the first locking part is greater than that of the second locking part, the diameter changing portion is of smooth transition through a slant face, and the contact point is in contact with the slant transition face during the retracting of the locking rod.

Or, the position switch 336 is an inductive switch, the triggering structure serves as a signal emission part, the signal emission part is arranged on the locking rod and moves together with the locking rod 302; the inductive switch is fixedly arranged at the outer side of the locking rod in a fixed arrangement manner, and an induction part of the inductive switch faces to the locking rod. The locking rod sticks into and/or leaves the locking hole, the signal emission part emitting stretching and/or leaving signals on the locking rod corresponds to the induction part of the inductive switch and triggers the inductive switch to send out locking rod stretching and/or leaving signals, whether the locking rod is locked in place or unlocked in place or not is accurately judged by using the position of the locking rod, the judgment is accurate, and the structure is simple. The signal emission part is a magnetic signal or photo-electric signal or microwave signal emission part.

A locking signal emission part and an unlocking signal emission part are separately arranged on the locking rod 302; after the locking rod 302 sticks into the locking hole 301 and is locked in place, the locking signal emission part is over against the induction part of the inductive switch, and the inductive switch receives a locking signal from the locking signal emission part and sends the locking signal to the master control board. After the locking rod leaves the locking hole and is subjected to retracting resetting, the unlocking signal emission part is over against the induction part of the inductive switch, and the inductive switch receives an unlocking signal from the unlocking signal emission part and sends the unlocking signal to the master control board.

The slideway 304 is arranged outside the locking rod and is used for guiding the locking rod 302 to move along the direction of the slideway 304, and thus, the locking rod 302 is conveniently stretch into the locking hole 301. And the position switch 336 is arranged in the side wall of the slideway or arranged at the end part of the slideway. If the position switch 336 is arranged in the side wall of the slideway, an opening for mounting the position switch is formed in the internal wall of the slideway, and the position switch 336 is mounted in the opening.

The position switch 336 is arranged in the side wall of the slideway of the fixing seat 303 or arranged at the end part of the slideway; preferably, the position switch 336 is arranged in the through hole, which is used for enabling the locking rod 302 to pass through, of the mounting part 329 of the shell 328 of the rotating motor 324. An opening for mounting the position switch 336 is formed in the side wall of the through hole, the position switch 336 is arranged at such a position close to the rotating motor, thus, wiring is facilitated, and the wiring of the position switch 336 and the wiring of connecting wires of the rotating motor can be arranged together.

When the locking mechanism receives a false signal, the locking rod 302 stretches out, but does not stretch into the locking hole 301, the locking rod 302 jacks up other positions of the bottom of the inner tub, and the other positions of the bottom of the inner tub are lower than that of the locking hole 301; and the locking rod 302 does not rise to the highest point, thus, the locking rod will tightly jack up the bottom of the inner tub, then, the rotating motor 324 still drives the locking rod to upwards move, then, the motor is subjected to rotation blocking and stocking, even, the burnout of the motor may be caused, and then, the locking rod cannot be reset, cannot enter the next working cycle, needs manual setting and even can only enter the next working cycle by dismounting the inner tub.

In order to solve the above-mentioned problem, the lower end of the locking rod 302 is connected with the link of the crank-link structure, and an idle stroke is arranged between the link and the crank and/or between the link and the locking rod. When the locking mechanism receives a false signal, the locking rod stretches out, but does not stretch into the locking hole 301, the locking rod 302 jacks up other positions of the bottom of the inner tub, and the other positions of the bottom of the inner tub are lower than that of the locking hole; the locking rod 302 does not rise to the highest point, thus, the locking rod 302 will tightly jack up the bottom of the inner tub, and then, the rotating motor still drives the locking rod 302. Then, as the locking rod tightly jacks up the bottom of the inner tub, the idle stroke arranged between the link and the crank and/or between the link and the locking rod starts to be in action, the rotating motor drives the crank or link to move in the idle stroke; and when the motor passes through the motor-driven highest point, the motor continues to drive the locking rod to downwards move to reset, the locking rod re-enters the next working cycle. Thus, there is no damage caused to the motor or the bottom of the inner tub, manual setting or washing machine disassembled maintenance are not required, the failure of the washing machine is avoided, and unnecessary trouble to users is avoided.

The idle stroke is a compressible distance along the length direction of the link. Or, the idle stroke is a movement space arranged along the length direction of the link, the crank and/or a connecting end of the locking rod moves in the movement space, and the locking state does not change. When the locking rod 302 cannot be driven, the compressible space is compressed; and when the motor passes through the motor-driven highest point, the motor continues to drive the locking rod to downwards move to reset, and the locking rod re-enters the next working cycle.

The idle stroke can be provided by an elliptical hole 331, the link is a connecting arm 330, hinge holes are separately formed in the two ends of the connecting arm 330, the hinge hole of one end of the connecting arm is hinged to the end part of the locking rod 302, the hinge hole of the other end of the connecting arm is hinged to the crank, and one or both of the hinge holes are elliptical holes 331. When the locking rod cannot be driven, the elliptical hole can provide a certain moving displacement, thus, the motor can rotate through the driven highest point, the motor continues to drive the locking rod to downwards move to reset, and the locking rod re-enters the next working cycle.

Or, the idle stroke is provided by a spring, when the locking rod 302 cannot be driven, the spring provides a certain moving displacement, thus, the motor rotates through the driven highest point, the motor continues to drive the locking rod to downwards move to reset, and the locking rod re-enters the next working cycle. The link comprises the connecting arm 330, a first spring 332 and a slider 334, one end of the first spring 332 is fixed to the connecting arm 330, the other end of the first spring 332 is fixed to the slider 334, the slider 334 is in sliding connection with the connecting arm 330. One end, fixed to the first spring 332, of the connecting arm 330 is hinged to the locking rod 302, and one end, where the slider is arranged, of the connecting arm 330 is hinged to the crank through the slider 334. When the locking rod 302 jacks up other positions of the bottom of the inner tub and cannot be driven, the slider 334 will slide on the connecting arm and compresses the first spring 332, thus, the motor can rotate through the driven highest point, the motor continues to drive the locking rod to downwards move to reset, and the locking rod re-enters the next working cycle.

A groove/an opening 339 is formed in the middle of the connecting arm, the first spring 332 and the slider 334 are connected in series and are arranged in the groove/opening 339 along the length direction, the slider 334 is in sliding connection with the groove/opening 339, one end of the first spring is fixed to the end part of the groove/opening 339, and the other end of the first spring is fixed to the slider 334.

Preferably, mounting columns 335 are separately arranged at the end part of the groove/opening 339 and an end face, over against the end part, of the slider, and the two ends of the first spring separately sleeve the mounting columns 335.

Preferably, two mutual-dead-opposite end faces of the mounting columns 335 are slant faces or stepped end faces. Under the condition of guaranteeing an amount of compression, the condition that the assembled length of the first spring and the mounting columns is the greatest is ensured, and thus, the spring is reliably mounted and is not prone to pop-up during compression; and compared with flat end faces, the space is saved, and the occupied space in the height direction is minimum.

Embodiment II

Referring to FIG. 7 to FIG. 12, according to a drainage control mechanism of an inner tub of the present disclosure, a drainage port is formed in the bottom of the inner tub. The drainage control mechanism at least comprises a stretchable and retractable valve plug, and the valve plug moves upwards to close the drainage port, moves downwards to open the drainage port; the valve plug is fixed in the circumferential direction; when the valve plug moves upwards to block off the drainage port 105, the drainage port 105 is controlled to be closed; and when the valve plug moves downwards to leave the drainage port 105, the drainage port 105 is controlled to be opened. The drainage control mechanism further comprises a crank-link structure, and the lower end of the valve plug is connected with a link of the crank-link structure. When the drainage control mechanism receives a false signal, the valve plug stretches out, but does not stretch into the drainage port, the valve plug jacks up other positions of the bottom of the inner tub, such as an inner tub flange, and the other positions of the bottom of the inner tub are lower than that of the drainage port; and the valve plug does not rise to the highest point, thus, the valve plug will tightly jack up the bottom of the inner tub. Meanwhile, a rotating motor still drives the valve plug to upwards move, then, the motor is subjected to rotation blocking and stocking, even, the burnout of the motor can be caused, and then, the valve plug cannot be reset and cannot enter the next working cycle, needs manual setting and even can only enter the next working cycle by dismounting the inner tub.

In order to solve the above-mentioned problem, an idle stroke is arranged between the link and a crank and/or between the link and the valve plug. When the drainage control mechanism receives a false signal, the valve plug stretches out, but does not stretch into the drainage port, the valve plug jacks up other positions of the bottom of the inner tub, and the other positions of the bottom of the inner tub are lower than that of the drainage port; the valve plug does not rise to the highest point, thus, the valve plug will tightly jack up the bottom of the inner tub. Meanwhile, the rotating motor still drives the valve plug; then, as the valve plug tightly jacks up the bottom of the inner tub, the idle stroke arranged between the link and the crank and/or between the link and the valve plug starts to be in action, the rotating motor drives the crank or link to move in the idle stroke. And when the motor passes through the motor-driven highest point, the motor continues to drive the valve plug to downwards move to reset, the valve plug re-enters the next working cycle, the damage to the motor or the bottom of the inner tub cannot be caused, manual setting or washing machine disassembled maintenance is not required, the failure of the washing machine is avoided, and unnecessary trouble to users is avoided.

The idle stroke is a compressible distance along the length direction of the link. Or, the idle stroke is a movement space arranged along the length direction of the link, the crank and/or a connecting end of the valve plug move in the movement space, and the drainage state does not change. When the valve plug cannot be driven, the compressible distance is compressed; and when the motor passes through the motor-driven highest point, the motor continues to drive the valve plug to downwards move to reset, and the valve plug re-enters the next working cycle.

The idle stroke can be provided by an elliptical hole 422, the link is a connecting arm 421, hinge holes are separately formed in the two ends of the connecting arm 421, the hinge hole of one end of the connecting arm is hinged to the end part of the valve plug, the hinge hole of the other end of the connecting arm is hinged to the crank, and one or both of the hinge holes are elliptical holes 422. When the valve plug cannot be driven, the elliptical hole 422 can provide a certain moving displacement, thus, the motor can rotate through the driven highest point, the motor continues to drive the valve plug to downwards move to reset, and the valve plug re-enters the next working cycle.

Or, the idle stroke can be provided by a spring, when the valve plug cannot be driven, the spring can provide a certain moving displacement, thus, the motor can rotate through the driven highest point, the motor continues to drive the valve plug to downwards move to reset, and the valve plug re-enters the next working cycle. The link comprises the connecting arm 421, a first spring 423 and a slider 424, one end of the first spring 423 is fixed to the connecting arm 421, the other end of the first spring 423 is fixed to the slider 424, the slider 424 is in sliding connection with the connecting arm 421, one end, fixed to the first spring, of the connecting arm 421 is hinged to the valve plug, and one end, where the slider 424 is arranged, of the connecting arm 421 is hinged to the crank through the slider 424. When the valve plug jacks up other positions of the bottom of the inner tub and cannot be driven, the slider will slide on the connecting arm and compresses the first spring, thus, the motor can rotate through the driven highest point, the motor continues to drive the valve plug to downwards move to reset, and the valve plug re-enters the next working cycle.

A groove/opening is formed in the middle of the connecting arm 421, the first spring 423 and the slider 424 are connected in series and are arranged in the groove/opening along the length direction, the slider 424 is in sliding connection with the groove/opening, one end of the first spring 423 is fixed to the end part of the groove/opening, and the other end of the first spring is fixed to the slider 424.

Preferably, mounting columns 425 are separately arranged at the end part of the groove/opening and an end face, over against the end part, of the slider 424, and the two ends of the first spring 423 separately sleeve the mounting columns 425.

Preferably, opposite end faces of the mounting columns 425 are slant faces or stepped end faces. Under the condition of guaranteeing an amount of compression, the condition that the assembled length of a second spring and the mounting columns is the greatest can be ensured, and thus, the spring can be reliably mounted and is not prone to pop-up during compression; and compared with flat end faces, the space is saved, and the occupied space in the height direction is minimum.

The valve plug comprises a stretchable and retractable valve rod 401 and a sealing sleeve 402, which is arranged on the valve rod 401 and stretches and retracts along with the stretching and retracting of the valve rod, and the lower end of the valve rod is connected with the link.

Preferably, the top of the valve rod 401 is an elastic structure, or, the sealing sleeve 402 extends towards the top of the valve rod, at least covers a part of the top of the valve rod and at least extends inside the drainage port when the top of the valve rod is aligned with the drainage port.

Preferably, the sealing sleeve 402 extends towards the top of the valve rod 401 until the top of the valve rod 401 is completely covered; the end, located at the top of the valve rod 401, of the sealing sleeve 402 is a closed structure and sleeves the top of the valve rod 401. A first end 404 of the sealing sleeve 402 is a sealing structure and sleeves the top of the valve rod 401, a second end 405 of the sealing sleeve 402 is in sealed connection with the fixing shell; and preferably, the sealing sleeve 402 is corrugated-tube-shaped. The valve rod 401 drives the sealing sleeve 402 to move upwards to the drainage port 105, the valve rod squeezes the first end of the sealing sleeve 402 until the first end is in tight fit with the drainage port 105 and seals up the drainage port 105; preferably, the upper surface of the valve rod is an upward-convex spherical surface structure, and the sealing effect is better. The sealing sleeve is a sealing sleeve made from an elastic material, such as a rubber sleeve.

A second spring 413 is arranged at the periphery of the valve rod 401, one end of the second spring 413 is fixed to the upper part of the valve rod 401, the other end of the second spring 413 is fixed to a fixing structure. The second spring is a compression spring, and a resetting force of the second spring can drive the valve rod to upwards move and can also jack up the valve plug to block off the drainage port.

Downward resetting movement of the valve rod 401 is driven by the crank-link structure, upward stretching of the valve rod 401 is driven by the resetting force of the second spring 413 after the crank-link structure releases a tensile force, and meanwhile, the resetting force of the second spring 413 can also enable the valve plug to block off the drainage port 105.

Preferably, a blocking sheet 403 capable of blocking off a drainage port in the bottom of the inner tub is arranged at the top of the valve rod 401, preferably, the valve rod 401 is a T-shaped structure. The second spring 413 is arranged below the blocking sheet, one end of the second spring 413 is in contact with the lower surface of the blocking sheet 403, and the other end of the second spring 413 is fixed.

The drainage control mechanism further comprises a fixing seat 407 of the valve rod 401, a slideway is arranged at the center of the fixing seat, and the center of the fixing seat 407 is upwards and/or downwards bent to form the slideway 408 of the valve rod 401. The valve rod penetrates through the slideway, preferably, the other end of the second spring is fixed to the fixing seat, the slideway 408 is sleeve-shaped, the inside diameter of the slideway 408 is slightly greater than the outside diameter of the valve rod 401, the clearance cannot be too small so that the valve rod 401 can freely slide in the slideway 408, while the clearance cannot be too big so that the direction of movement of the valve rod 401 cannot be deviated greatly. A plurality of axial bulges are uniformly distributed on the internal wall of the slideway 408 along a circumferential direction, tops of the bulges are in line contact with the surface of the valve rod 401, thus, the bulges play a role in guiding the valve rod 401, the valve plug is aligned with the drainage port, shaking is avoided, the area of contact is reduced, the friction is reduced, and the valve rod 401 is freely slide in the slideway 408.

The drainage control mechanism further comprises a fixing shell 409, the fixing shell 409 is sleeve-shaped, the fixing shell is mounted on the fixing seat 407, the valve plug is arranged in the fixing shell, and a sealing sleeve of the valve plug is connected with the fixing shell.

Preferably, the sealing sleeve 402 of the valve plug is connected with the lower end of the fixing shell; and an outer edge, located at the top of the valve rod, of the sealing sleeve extends outwards to form a turn-up. After the valve plug moves downwards and the drainage port is opened, the turn-up is lapped to the upper end of the fixing shell; when the valve plug moves downwards to leave the drainage port 105, water in the inner tub 100 will immediately downwards flow out, and water flows to the upper end, i.e., the first end 404 of the valve plug and the turn-up 410, then, is diffused towards the periphery of the valve plug through the guiding of the turn-up 410, and thus, the impact on the drainage control mechanism due to the fact that water flow directly rushes into the fixing shell is avoided. When the valve plug is located at the lowest position, the turn-up 410 is lapped to the fixing shell 409 or the upper end of a second mounting hole 204, impurities such as wire scraps in the water flow can be prevented from entering the fixing shell and hindering the stretching and retracting of the valve plug. A water leaking port is formed in the lower part of the fixing shell. A drainage pipe is arranged at the water leaking port 411 and is connected to a drainage pipeline of the washing machine. The sealing sleeve 402 sleeves the valve rod 401, the second end 405 of the sealing sleeve 402 and the fixing shell 409 are sealed, and thus, water flow cannot be completely blocked off by the turn-up 410 and will enter a space between the fixing shell 409 and the sealing sleeve 402 to some extent; and by arranging the water leaking port 411, the water entering the space can be drained to the drainage pipeline of the washing machine through the water leaking port 411 and thus is discharged from the washing machine.

Preferably, an outer edge of the first end 404 of the sealing sleeve 402 extends outwards to form a third end, the third end is in sealed connection with the upper end of the fixing shell 409, and the extending part is a sealing sleeve capable of stretching and retracting along with the stretching and retracting of the valve rod; preferably a corrugated-tube-shaped sealing sleeve. The sealing sleeve between the extending third end and the first end 404 can seal up the space between the fixing shell 409 and the sealing sleeve 402, the water flow is prevented from flowing into the space between the fixing shell 409 and the sealing sleeve 402, in this case, the sealing sleeve between the second end 405 and the first end 404 can be omitted. However, in order to achieve safety or prevent seal failure of the sealing sleeve between the third end and the first end 404, the sealing sleeve between the second end 405 and the first end 404 is arranged optimally, in this case, the space between the fixing shell 409 and the sealing sleeve 402 is sealed up, and thus, the water leaking port 411 is not required to be formed in the lower part of the fixing shell 409.

The crank is connected with a rotating motor 416, the rotating motor 416 is arranged in a shell 417, a mounting part 418 is arranged on the shell and is fixed below the fixing seat 407, or the mounting part 418 and the fixing seat 407 are formed integrally; preferably, the crank is an eccentric wheel 415, an eccentric shaft of the eccentric wheel 415 is hinged to the link, and the center of the eccentric wheel 415 is connected with the rotating motor.

The drainage control mechanism is arranged at the bottom of the outer tub of the washing machine, and a sealing structure is arranged between the drainage control mechanism and the outer tub.

Preferably, the second mounting hole 204 of the drainage control mechanism is formed in the outer tub, the fixing seat of the drainage control mechanism is mounted at the bottom of the outer tub, the fixing shell of the drainage control mechanism is mounted in the second mounting hole, and a sealing structure is arranged between the fixing shell and the second mounting hole.

Preferably, the upper end of the second mounting hole 204 bents inwards to form a bend, the lower end of the fixing shell 409 bents outwards to form a bend; the fixing shell 409 stretches into the second mounting hole 204, the upper end of the fixing shell 409 is abutted against the bend of the upper end of the second mounting hole 204, the lower end of the second mounting hole 204 is abutted against the bend of the lower end of the fixing shell 409, the second end 405 of the sealing sleeve 402 is squeezed between the lower end of the second mounting hole 204 and the bend of the lower end of the fixing shell 409 to form a seal, and thus, water leakage of this position is avoided.

Embodiment III

Figure 13:
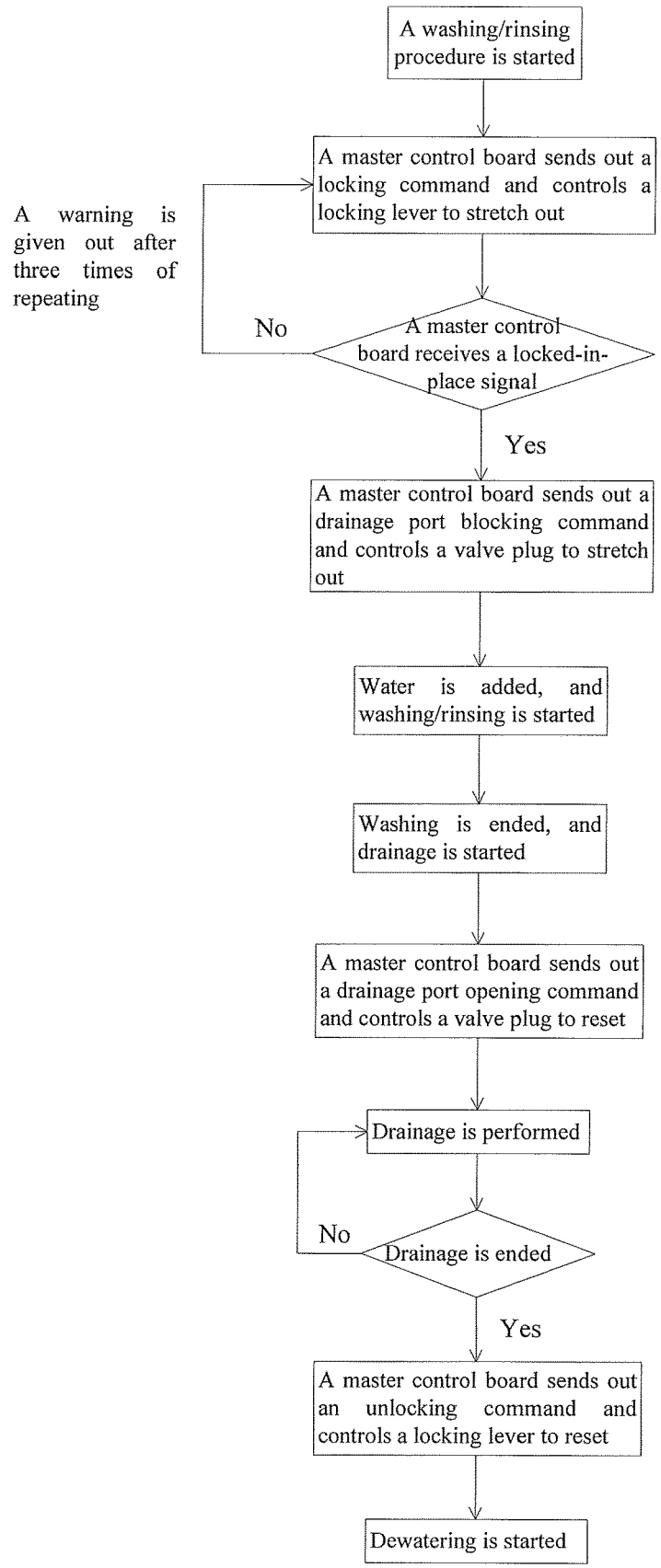
FIG. 13 is a flow chart of a control method of a washing machine of the present disclosure.

Referring to FIG. 13, according to a control method of a water-saving washing machine, of which a locking hole and a drainage port are formed in the bottom of an inner tub, and a locking mechanism and a drainage control mechanism are arranged at the bottom of an outer tub, and the control method comprises the following steps:

Step I: a washing/rinsing procedure is carried out, a master control board controls the locking mechanism to couple with the locking hole to lock the inner tub, and the drainage control mechanism blocks off the drainage port, a water inlet valve enables water to enter into the inner tub of the washing machine until a set water level or water volume is reached, washing is started, wherein water is absent between the inner tub and the outer tub.

The master control board sends out an inner tub locking command after receiving a washing/rinsing signal, the inner tub is driven to rotate to enable the locking hole to be in a position corresponding to a locking rod of the locking mechanism, and the locking rod is controlled to get into the locking hole. The locking mechanism sends out a locked-in-place signal to the master control board after the locking rod sticks into the locking hole in place.

Or, the master control board sends out the inner tub locking command after receiving the washing/rinsing signal, the inner tub is driven to rotate, the locking rod of the locking mechanism is controlled to stretch out, the locking rod sticks into the locking hole when the locking hole is in a position corresponding to the locking rod, and the locking mechanism sends out the locked-in-place signal to the master control board after the locking rod getting into the locking hole in place.

After the master control board sends out the inner tub locking command and receives the locked-in-place signal, the master control board sends out a drainage port closing command A valve plug of the drainage control mechanism is controlled to protrude to block off the drainage port.

If the master control board does not receive the locked-in-place signal sent from the locking mechanism in set time or set detection times after sending out the inner tub locking command, the master control board controls the locking rod to be subjected to restoring and resends out the inner tub locking command.

If the master control board does not receive the locked-in-place signal sent from the locking mechanism in the set time or set detection times after resending out the inner tub locking command for set times, the master control board sends out a warning command and performs warning. The damage to parts and components due to the fact that the master control board sends out the command all the way after failure is avoided.

Step II: a drainage procedure is carried out after the washing/rinsing procedure ends up, the master control board controls the drainage control mechanism to open the drainage port, and majority of water in the inner tub is drained through the drainage port. After the washing procedure ends up, the master control board sends out a drainage valve opening command and controls the valve plug of the drainage control mechanism to be subjected to restoring, and the drainage port is opened to drain.

Step III: a dewatering procedure is carried out after the drainage procedure ends up, the master control board controls the locking mechanism to release the inner tub, and to drive the inner tub to rotate for dehydration. After the drainage procedure ends up, the master control board sends out an inner tub releasing command and controls the locking rod to restore, the locking mechanism sends out an unlocked-in-place signal after the locking rod is subjected to restoring, and the inner tub is controlled to rotate to carry out dehydrating after the master control board receives the unlocked-in-place signal.

In the step II and the step III, the locking mechanism is controlled to leave the locking hole to release the inner tub while or before the master control board controls the drainage control mechanism to open the drainage port.

The locking rod is a diameter-variable cylinder. A position switch is arranged at the locking mechanism corresponding to an outer side of the locking rod. After the locking rod sticks into the locking hole in place and the locking rod is subjected to restoring, portions with different diameters of the locking rod correspond to a contact point of the position switch and trigger the position switch to send out corresponding signals.

After the locking rod sticks into the locking hole in place, the portion with a small diameter of the locking rod corresponds to the position switch, the contact point is released, and the position switch sends out the locked-in-place signal to the master control board. After the locking rod is subjected to restoring, the portion with a big diameter of the locking rod corresponds to the contact of the position switch, the contact point is compressed, and the position switch sends out the unlocked-in-place signal to the master control board.

Or, after the locking rod sticks into the locking hole in place, the portions with a big diameter of the locking rod corresponds to the position switch, the contact is compressed, and the position switch sends out the locked-in-place signal to the master control board. After the locking rod is subjected to restoring, the portion with a small diameter of the locking rod corresponds to the contact of the position switch, the contact is reset, and the position switch sends out the unlocked-in-place signal to the master control board.

According to the control method, the washing on the condition that water is absent between the inner tub and the outer tub is achieved through controlling a sequence of operation of the locking mechanism for the inner tub and the drainage control mechanism of the inner tub drainage port, and normal dewatering can also be achieved; and the control method is accurate in control, and water-saving washing of the washing machine is smoothly guaranteed.

The above-mentioned embodiments are only preferred embodiments of the present disclosure, and it should be noted that various alterations and improvements may be made therein by those of ordinary skill in the art without departing from the principle of the present disclosure and should also fall within the scope of protection of the present disclosure.

The invention claimed is:

1. A control method of a water-saving washing machine of which a locking hole and a drainage port are formed in the bottom of an inner tub, and a locking mechanism and a drainage control mechanism are arranged at the bottom of an outer tub, comprising:
    Step I: carrying out a washing/rinsing procedure,
    a master control board controlling the locking mechanism to couple with the locking hole to lock the inner tub, and the drainage control mechanism blocking off the drainage port,
    supplying water to the inner tub of the washing machine until a set water level or water volume is reached,
    starting washing, wherein water is absent between the inner tub and the outer tub;
    Step II: carrying out a drainage procedure after the washing/rinsing procedure ends up,
    the master control board controlling the drainage control mechanism to open the drainage port, and water in the inner tub being drained through the drainage port;
    Step III: carrying out a dewatering procedure after the drainage procedure ends up,
    the master control board controlling the locking mechanism to release the inner tub, and to drive the inner tub to rotate for dehydration.

2. The control method of a water-saving washing machine according to claim 1, wherein,
    in the Step I, the master control board sends out an inner tub locking command after receiving a washing/rinsing signal,
    the inner tub is driven to rotate to enable the locking hole to be in a position corresponding to a locking rod of the locking mechanism, and the locking rod is controlled to get into the locking hole,
    the locking mechanism sends out a locked-in-place signal to the master control board after the locking rod sticks into the locking hole in place.

3. The control method of a water-saving washing machine according to claim 2, wherein,
    after the master control board sends out the inner tub locking command and receives the locked-in-place signal, the master control board sends out a drainage port closing command,
    a valve plug of the drainage control mechanism is controlled to protrude to block off the drainage port,
    if the master control board does not receive the locked-in-place signal sent from the locking mechanism in set time or set detection times after sending out the inner tub locking command, the master control board controls the locking rod to be subjected to restoring and resends out the inner tub locking command.

4. The control method of a water-saving washing machine according to claim 3, wherein, if the master control board does not receive the locked-in-place signal sent from the locking mechanism in the set time or set detection times after resending out the inner tub locking command for set times, the master control board sends out a warning command and performs warning.

5. The control method of a water-saving washing machine according to claim 4, wherein, the locking rod is a diameter-variable cylinder, a position switch is arranged at the locking mechanism corresponding to an outer side of the locking rod, after the locking rod sticks into the locking hole in place and the locking rod is subjected to restoring, portions with different diameters of the locking rod correspond to a contact of the position switch and trigger the position switch to send out corresponding signals.

6. The control method of a water-saving washing machine according to claim 3, wherein, the locking rod is a diameter-variable cylinder, a position switch is arranged at the locking mechanism corresponding to an outer side of the locking rod, after the locking rod sticks into the locking hole in place and the locking rod is subjected to restoring, portions with different diameters of the locking rod correspond to a contact of the position switch and trigger the position switch to send out corresponding signals.

7. The control method of a water-saving washing machine according to claim 2, wherein, the locking rod is a diameter-variable cylinder, a position switch is arranged at the locking mechanism corresponding to an outer side of the locking rod, after the locking rod sticks into the locking hole in place and the locking rod is subjected to restoring, portions with different diameters of the locking rod correspond to a contact of the position switch and trigger the position switch to send out corresponding signals.

8. The control method of a water-saving washing machine according to claim 1, wherein, in the step II, after the washing/rinsing procedure ends up, the master control board sends out a drainage valve opening command and controls the valve plug of the drainage control mechanism to be subjected to restoring, and the drainage port is opened to drain.

9. The control method of a water-saving washing machine according to claim 8, wherein, the locking rod is a diameter-variable cylinder, a position switch is arranged at the locking mechanism corresponding to an outer side of the locking rod, after the locking rod sticks into the locking hole in place and the locking rod is subjected to restoring, portions with different diameters of the locking rod correspond to a contact of the position switch and trigger the position switch to send out corresponding signals.

10. The control method of a water-saving washing machine according to claim 1, wherein, in the step III, after the drainage procedure ends up, the master control board sends out an inner tub releasing command and controls the locking rod to restore, the locking mechanism sends out an unlocked-in-place signal after the locking rod is subjected to restoring, and the inner tub is controlled to rotate to carry out dehydrating after the master control board receives the unlocked-in-place signal.

11. The control method of a water-saving washing machine according to claim 10, wherein, the locking rod is a diameter-variable cylinder, a position switch is arranged at the locking mechanism corresponding to an outer side of the locking rod, after the locking rod sticks into the locking hole in place and the locking rod is subjected to restoring, portions with different diameters of the locking rod correspond to a contact of the position switch and trigger the position switch to send out corresponding signals.

12. The control method of a water-saving washing machine according to claim 1, wherein, after the locking rod sticks into the locking hole in place, the portion with a small diameter of the locking rod corresponds to the position switch, the contact is released, and the position switch sends out the locked-in-place signal to the master control board;

after the locking rod is subjected to restoring, the portion with a big diameter of the locking rod corresponds to the contact of the position switch, the contact is compressed, and the position switch sends out the unlocked-in-place signal to the master control board;

Or, after the locking rod sticks into the locking hole in place, the portions with a big diameter of the locking rod corresponds to the position switch, the contact is compressed, and the position switch sends out the locked-in-place signal to the master control board;

after the locking rod is subjected to restoring, the portion with a small diameter of the locking rod corresponds to the contact of the position switch, the contact is reset, and the position switch sends out the unlocked-in-place signal to the master control board.

13. The control method of a water-saving washing machine according to claim 1, wherein, in the step II and the step III, the locking mechanism is controlled to leave the locking hole to release the inner tub while or before the master control board controls the drainage control mechanism to open the drainage port.

14. A washing machine having the control method according to claim 1.

* * * * *